(12) United States Patent
Wang

(10) Patent No.: US 9,842,068 B2
(45) Date of Patent: Dec. 12, 2017

(54) METHODS OF BUS ARBITRATION FOR LOW POWER MEMORY ACCESS

(75) Inventor: Feng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2088 days.

(21) Appl. No.: 12/760,240

(22) Filed: Apr. 14, 2010

(65) Prior Publication Data

US 2011/0258354 A1 Oct. 20, 2011

(51) Int. Cl.
*G06F 13/14* (2006.01)
*G06F 13/16* (2006.01)

(52) U.S. Cl.
CPC ........ *G06F 13/161* (2013.01); *G06F 13/1684* (2013.01); *Y02B 60/1228* (2013.01)

(58) Field of Classification Search
CPC .... G06F 13/4081; G06F 13/00; G06F 13/385; G06F 13/4022; G06F 13/409; G06F 13/4063; G06F 13/4068; G06F 2213/0024; H04N 2201/0058
USPC ........ 710/305–306, 240–244, 200, 104–105; 711/154; 713/300
See application file for complete search history.

(56) References Cited

U.S. PATENT DOCUMENTS

| | | | |
|---|---|---|---|
| 6,564,304 B1 | 5/2003 | Van Hook et al. | |
| 7,127,573 B1 | 10/2006 | Strongin et al. | |
| 7,581,073 B2 * | 8/2009 | Gower et al. | 711/154 |
| 2003/0033493 A1 | 2/2003 | Cismas | |
| 2003/0061459 A1 | 3/2003 | Aboulenein et al. | |
| 2004/0139286 A1 | 7/2004 | Lin et al. | |
| 2004/0236889 A1 | 11/2004 | Kim | |
| 2005/0044289 A1 | 2/2005 | Hendel et al. | |
| 2005/0097265 A1 | 5/2005 | Shrader et al. | |
| 2006/0112240 A1 | 5/2006 | Walker et al. | |
| 2008/0144086 A1 * | 6/2008 | Shibao | 358/1.15 |
| 2008/0162852 A1 | 7/2008 | Kareenahalli et al. | |
| 2008/0288731 A1 | 11/2008 | Izumi | |
| 2009/0016137 A1 * | 1/2009 | Hur et al. | 365/226 |
| 2009/0063791 A1 * | 3/2009 | Cho | 711/154 |
| 2009/0177822 A1 | 7/2009 | Adar et al. | |

(Continued)

FOREIGN PATENT DOCUMENTS

CN 1383511 A 12/2002
CN 1573722 2/2005

(Continued)

OTHER PUBLICATIONS

International Search Report and Written Opinion—PCT/US2011/032546—ISA/EPO—Aug. 1, 2011.

(Continued)

*Primary Examiner* — Tim T Vo
*Assistant Examiner* — Kim T. Huynh
(74) *Attorney, Agent, or Firm* — Muncy, Geissler, Olds & Lowe, P.C./Qaulcomm

(57) ABSTRACT

Systems and method for arbitrating requests to a shared memory system for reducing power consumption of memory accesses, comprises determining power modes associated with memory channels of the shared memory system, assigning priorities to the requests based at least in part on the power modes, and scheduling the requests based on the assigned priorities. Latency characteristics and page hit rate are also considered for assigning the priorities.

23 Claims, 3 Drawing Sheets

(56) References Cited

U.S. PATENT DOCUMENTS

| | | | |
|---|---|---|---|
| 2009/0204771 A1 | 8/2009 | Kawamoto et al. |
| 2010/0115167 A1 | 5/2010 | Tardieux et al. |
| 2010/0312944 A1 | 12/2010 | Walker |

FOREIGN PATENT DOCUMENTS

| | | | |
|---|---|---|---|
| CN | 1735869 | A | 2/2006 |
| CN | 101639817 | A | 2/2010 |
| JP | 2008287528 | A | 11/2008 |
| JP | 2009193107 | A | 8/2009 |
| JP | 2010287057 | A | 12/2010 |
| TW | 1240166 | B | 9/2005 |
| WO | 0029959 | A1 | 5/2000 |
| WO | 2006058193 | A1 | 6/2006 |

OTHER PUBLICATIONS

Wang et al., "Bus Arbitration Techniques to Reduce Access Latency", U.S. Appl. No. 12/760,298, filed Apr. 14, 2010, 26 of pages.

* cited by examiner

METHODS OF BUS ARBITRATION FOR LOW POWER MEMORY ACCESS

REFERENCE TO CO-PENDING APPLICATIONS FOR PATENT

The present application for patent is related to the following co-pending U.S. patent application:

"BUS ARBITRATION TECHNIQUES TO REDUCE ACCESS LATENCY" by Wang Feng, having Attorney Docket No. 092055, filed concurrently herewith, assigned to the assignee hereof, and expressly incorporated by reference herein.

FIELD OF DISCLOSURE

Disclosed embodiments are related to bus arbitration techniques. In particular, disclosed embodiments are directed towards techniques to reduce memory access power in shared memory systems.

BACKGROUND

System architectures with shared memory structures are well known in the art. A shared or global memory space may be accessed by multiple processors or processing elements through a bus or interconnect system. The processing elements are notionally referred to as "bus masters" of the interconnect system, and the shared memory structure resides at the "slave" end. The bus masters make read/write requests to the shared memory resource. The requests are serviced by "memory controllers" at the slave end. In general, the memory controllers complete a point to point connection between a bus master and the common memory space in the interconnect system, in order to facilitate the transfer of data.

In order to increase the memory access speed, the shared memory space is typically interleaved. An interleaved memory system comprises two or more memory channels. A memory channel generally refers to a pathway between a computer system and peripheral devices. Memory data is distributed among the memory channels such that data words in different memory channels may be accessed in parallel.

It is quite common for multiple bus masters to compete with one another for accessing the shared memory space, since only one access request may be serviceable by a memory controller at any given time. Therefore, access of the shared memory is synchronized such that a bus master is not granted access, while another bus master is being serviced. Scheduling mechanisms or "arbitration schemes" are employed to synchronize and schedule requests from different bus masters in order to avoid contentions. A "bus arbiter" performs the task of arbitration.

A bus arbiter decides which bus master may be granted access to the memory at any given time. When two or more bus masters direct requests to a particular memory controller concurrently, only one is granted access, while the other masters must wait. One of the challenges faced by arbiters is ensuring that prioritizing certain bus masters to enable them to access the memory does not cause bus masters with lower priority to get locked out indefinitely or suffer unreasonable delays in gaining access. The maximum delay that can be incurred by a bus master, while ensuring error-free system behavior is generally referred to as the "latency characteristic" or "latency requirement" of the bus master.

A common arbitration scheme is a round robin arbitration scheme, wherein the available bandwidth is allocated evenly among all the bus masters. Memory access is granted according to a predetermined order without regard to latency requirements of individual bus masters. For example, a Digital Signal Processor (DSP) processing voice communications may require low latency communications, but a basic round robin scheme may prove to be very inefficient in accommodating such latency characteristics.

Another well known approach is a token based approach wherein a "token" is passed around the network and only a bus master possessing the token may be allowed access. Notions of priority and latency requirements are built into implementations of such schemes. A token based arbitration scheme attempts to guarantee latency requirements by allocating priority based on latency characteristics of the bus masters.

However, these and other well known arbitration schemes only consider latency requirements of bus masters in the arbitration process, and do not take into account the transactions at the slave end of the interconnect system. This often results in degradation of system performance and increased power consumption. For example, one of ordinary skill in the art will recognize that a common technique of reducing power consumption is to maintain logic elements of the system that are not actively used at any given time, in a "sleep" or "powered down" mode. "Powered down" mode may be defined as logic elements maintained with less applied power or no applied power, relative to the power applied to logic elements maintained in active states. Accordingly, well known techniques are employed to maintain memory channels in a powered down mode when they are not accessed. However, the process of powering down and subsequent powering up of the memory channels is itself expensive. Therefore power consumption is decreased by increasing the duration of time that a memory channel is uninterruptedly in a powered down mode, and decreasing the number of "wake up" operations.

In a conventional arbitration scheme, the bus arbiter does not differentiate between memory channels that are powered down and those that are currently being accessed (active) in deciding which bus master should be granted access. Thus, situations are commonly encountered, wherein granting access to a particular bus master would entail waking up a memory channel that was in powered down mode heretofore. However, it is also common that in a memory system, only a small subset of the bus masters have low latency requirements, wherein access requests need to be fulfilled immediately. The remaining bus masters have larger latency requirements. Therefore, a memory channel may be frequently woken up in order to service a request from a bus master which can afford to wait longer before being serviced.

By taking into account that a particular memory channel is powered down, a bus arbiter can delay servicing access requests to that memory channel from bus masters with high latency characteristics, such that the memory channel is maintained in powered down mode for the longest duration possible before the servicing must be completed. As a corollary, activity on memory channels which are already active may be maximized by prioritizing memory access requests to active memory channels over powered down memory channels. Significant power savings may be achieved by employing such arbitration schemes which take into account the "power mode" of memory channels at the slave side of the bus system. Accordingly, there is a need in the art for such techniques.

SUMMARY

Exemplary embodiments are directed to systems and method for arbitrating requests to a shared memory system based at least in part on reducing power consumption of memory accesses.

For example, an exemplary embodiment is directed to a method of arbitrating requests from bus masters for access to shared memory in a processing system comprising dividing the shared memory into memory channels, determining power modes associated with the memory channels, assigning priorities to the requests based at least in part on the power modes, and scheduling the requests based on the assigned priorities.

Another exemplary embodiment is directed to a processing system comprising a shared memory system divided into memory channels, bus masters configured to generate requests to the shared memory system, memory controllers configured to determine power modes associated with the memory channels and bus arbiters configured to assign priorities to the requests based at least in part on the power modes.

Yet another exemplary embodiment is directed to processing system comprising a shared memory divided by memory channel means, requests to the shared memory system generated by bus master means, means for determining power modes associated with the memory channels, means for assigning priorities to the requests based at least in part on the power modes and means for scheduling the requests based on the assigned priorities.

Another exemplary embodiment is directed to a method of arbitrating requests from bus masters for access to shared memory in a processing system comprising step for dividing the shared memory into memory channels, step for determining power modes associated with the memory channels, step for assigning priorities to the requests based at least in part on the power modes and step for scheduling the requests based on the assigned priorities.

BRIEF DESCRIPTION OF THE DRAWINGS

The accompanying drawings are presented to aid in the description of embodiments and are provided solely for illustration of the embodiments and not limitation thereof.

DETAILED DESCRIPTION

Aspects of the invention are disclosed in the following description and related drawings directed to specific embodiments. Alternate embodiments may be devised without departing from the scope of the invention. Additionally, well-known elements of the embodiments will not be described in detail or will be omitted so as not to obscure the relevant details of the various embodiments.

The word "exemplary" is used herein to mean "serving as an example, instance, or illustration." Any embodiment described herein as "exemplary" is not necessarily to be construed as preferred or advantageous over other embodiments. Likewise, the term "embodiments" or "embodiments of the invention" does not require that all embodiments include the discussed feature, advantage or mode of operation.

The terminology used herein is for the purpose of describing particular embodiments only and is not intended to be limiting of the various embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 1:
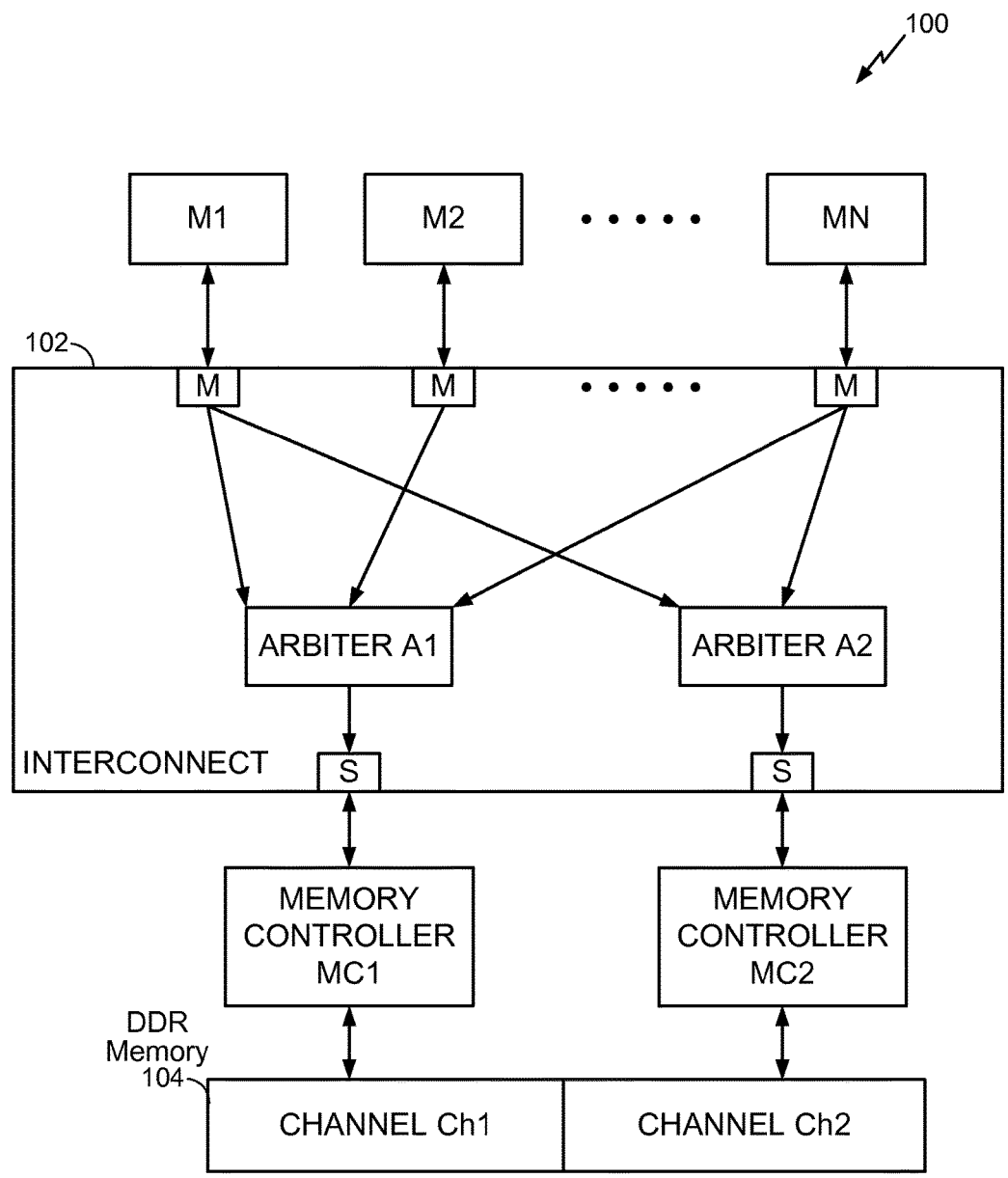
FIG. 1 illustrates a conventional bus interconnect system to facilitate the access of a shared memory system by a plurality of bus masters.

FIG. 1 illustrates a conventional shared memory system 100. Bus masters M1-MN make memory access requests through the medium of interconnect 102. Bus Arbiters A1 and A2 schedule the requests according to conventional techniques such as round robin or token based scheduling. Slave memory controllers MC1 and MC2 service the scheduled requests by communicating with a shared memory resource, such as Double Data Rate (DDR) Memory 104. System 100 does not take into consideration whether the memory channels need to be woken up from powered down mode in order to service a particular memory access request.

Figure 2:
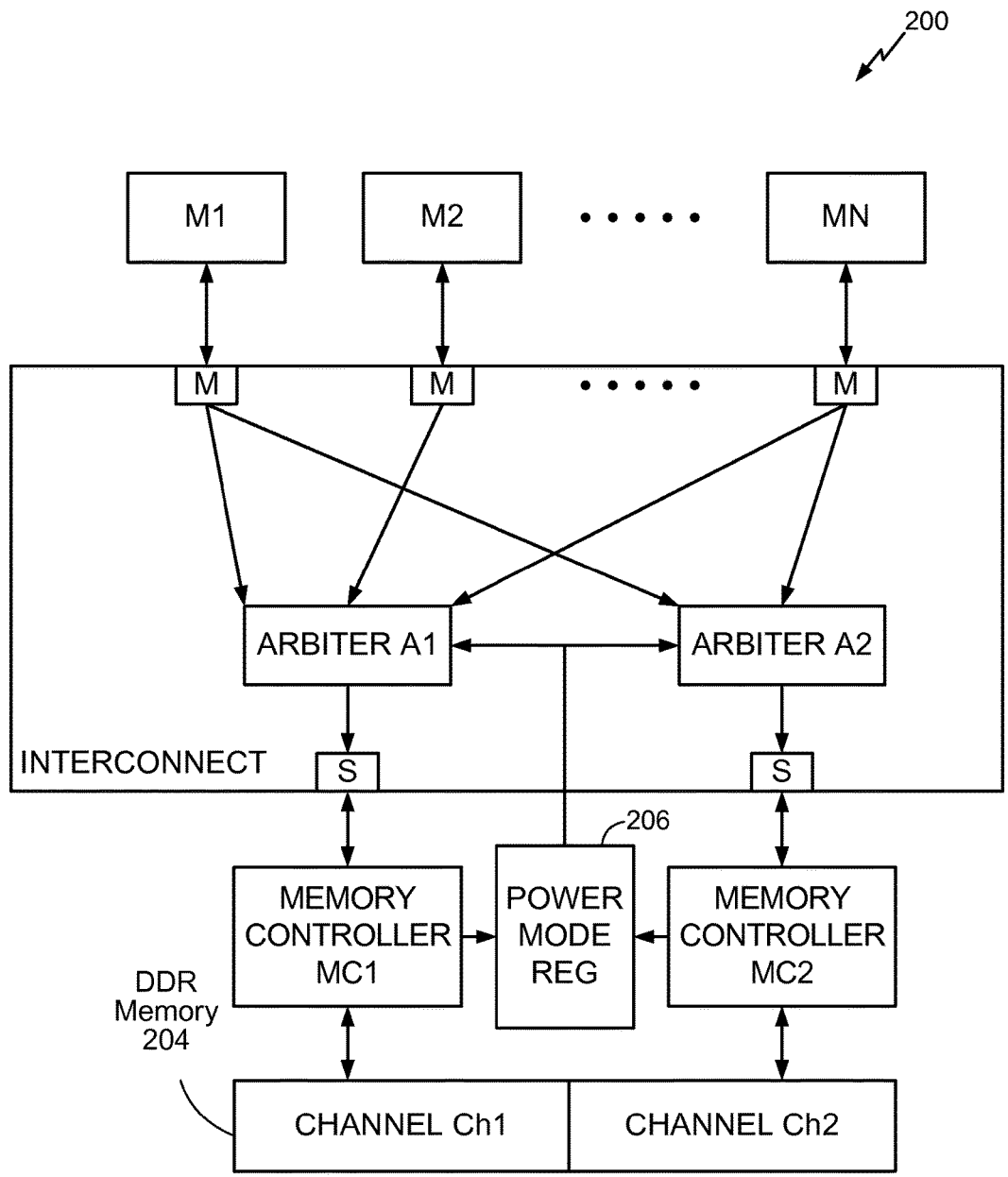
FIG. 2 illustrates an exemplary embodiment of a bus interconnect system, wherein arbitration is based at least in part on a power mode of memory channels in the shared memory system.

FIG. 2 illustrates an exemplary embodiment of processing system 200 wherein techniques of the various embodiments are advantageously employed. Interleaved Memory 204 is shown to comprise memory channels, Ch1 and Ch2. The channels Ch1, Ch2 are operable in at least two modes, namely a sleep mode (or powered down mode), and an active mode (or powered up mode).

In a non limiting example, a clock gating mechanism may be employed to configure the operation of the memory channels in the two power modes. By selective clock gating, a section of the clock network employed by a particular memory channel may be switched off, thus effectively powering down that memory channel. Such powering down functions may be executed in either hardware or software. When a memory channel is powered down, it may not be accessible for read/write operations. The memory channel may consume static power in the powered down mode, but the power consumption is significantly lower than in powered up mode.

The active or powered up mode is essentially the mode of operation wherein the memory channel may be accessed to process read/write requests for data contained therein. The memory channel consumes both static and dynamic power in this mode, and the dynamic or switching power is typically much larger than the static power consumed in the powered down mode. The process of transitioning from a powered up to a powered down mode, and vice versa, may itself be power consuming, and also require several clock cycles for completion. Accordingly, it is desirable to maintain a memory channel in a powered down mode for as long as possible, in order to maximize power savings.

According to an exemplary embodiment, information about the power mode of each memory channel is tracked by specialized logic. The specialized logic may be included in the memory controllers according to exemplary embodiments. FIG. 2 illustrates a Power Mode Register 206 that maintains the current power mode (powered down/powered up) of each of the memory channels Ch1, Ch2. A single bit is maintained in the register for each memory channel, with binary value "0" representing powered down mode, and binary value "1" representing powered up mode for that channel. The memory controllers MC1, MC2 update register 206 every time the power mode of a corresponding memory channel Ch1, Ch2 transitions from one mode to another.

Power Mode Register 206 communicates power mode information of each memory channel to the bus arbiters A1 and A2. Every time the bus arbiters A1 and A2 receive a request for a memory access from one of the bus masters M1-MN, they consider, among other factors, the latency requirement of the bus master, and the power mode of the memory channel which must be accessed in order to service the request.

In an illustrative example, at a particular instance in time, channel Ch2 is in a powered down mode, and channel Ch1 is active and currently processing a memory request assigned by arbiter A1. At this time, bus master M5 makes a request followed closely by M3, to arbiter A1. Servicing the two requests in order would require the access of memory channel Ch2 followed by channel Ch1. The latency requirements of both M3 and M5 are known to be high. In this scenario, arbiter A1 would prioritize servicing M3 over M5, because servicing M3 requires accessing memory channel Ch1 which is already active, but on the other hand, servicing M5 would require waking up Ch2, which is in powered down mode. If yet another request from bus master M2 for channel Ch1 arrives at arbiter A1 before the latency of M5 expires, it is possible that arbiter A1 may prioritize servicing M2 over M5, even though M5 arrived much earlier.

Accordingly, by taking into account the current power mode of the memory channels, exemplary embodiments prioritize servicing memory access requests in a manner that maintains memory channels in a powered down for the maximum duration. In the above illustrative example, if all the bus masters M2, M3 and M5 had identical latency requirements, the bus arbiter A1 may have prioritized the requests in the order in which they were received. Thus M5 would have been serviced first, causing channel Ch2 to be woken up. This may have sent channel Ch1 into sleep mode if it was inactive during the servicing of the request from M5. However, channel Ch1 would have to be woken up soon after, to service the request from M3. The switching between power modes for the memory channels in this manner increases power consumption. The inventive techniques advantageously decrease power consumption by tracking power modes of the channels Ch1, Ch2 and incorporating the power modes in the arbitration process.

Figure 3:
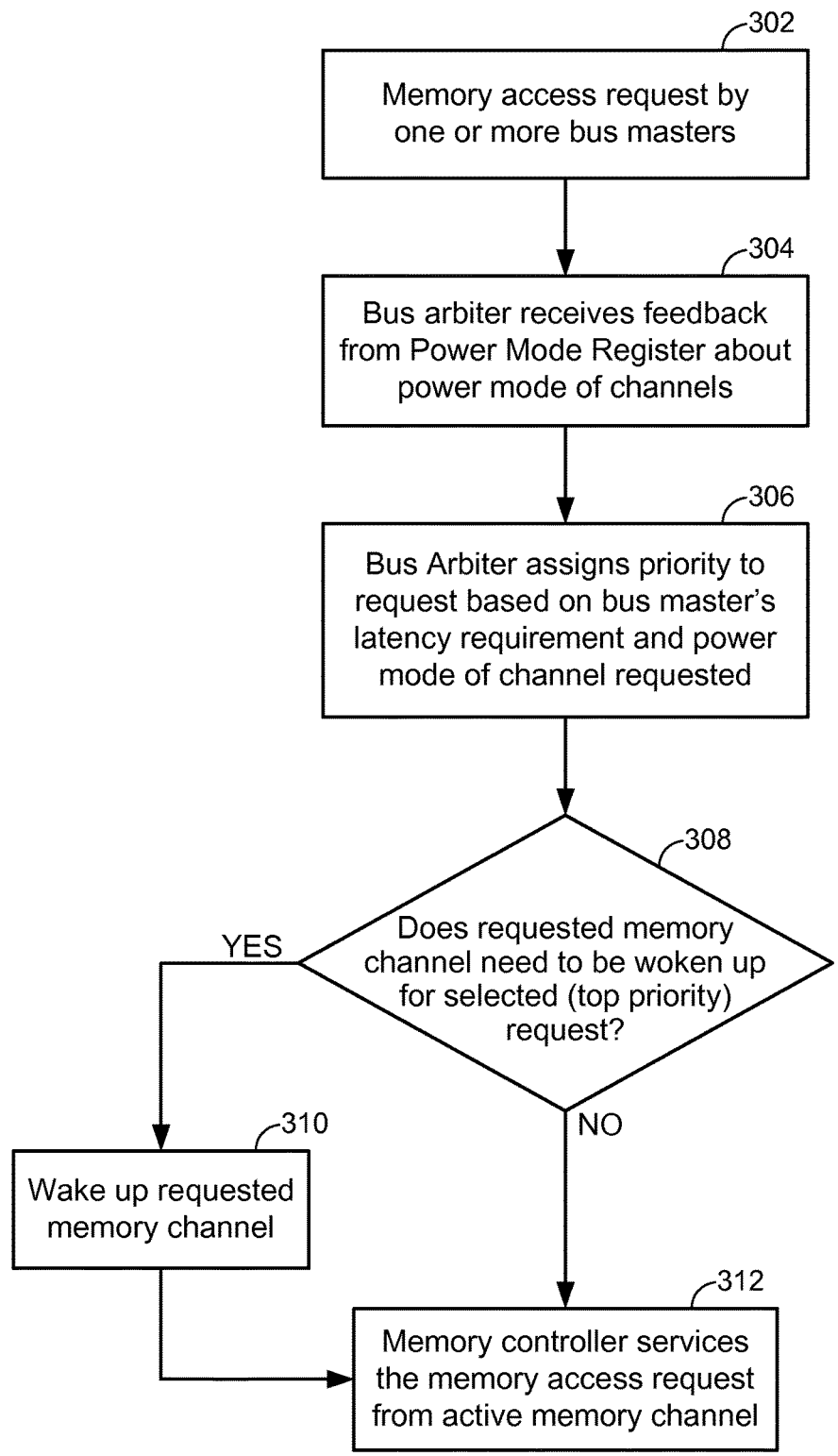
FIG. 3 illustrates a flow chart for an exemplary bus arbitration scheme, wherein arbitration is based at least in part on a power mode of memory channels in the shared memory system.

An exemplary embodiment of the inventive techniques is illustrated in the flowchart of FIG. 3. One or more bus masters make a memory access request at block 302. A bus arbiter associated with the memory channel(s) to which the requests are directed, receives feedback from a Power Mode Register regarding the power mode of the memory channels, at block 304. The arbiter assigns priority to the memory request based on predetermined algorithms taking into consideration the latency requirements of the bus masters and the power mode of the memory channels, in block 306. The predetermined algorithms ensure that a memory channel which is in sleep mode, will not be woken up, unless absolutely critical for meeting latency requirements of a bus master. At block 308, a determination is made whether the request that has been determined to be serviced next, would entail the wake up of a memory channel. If a memory channel needs to be woken up to service the request, the wake up operation is performed at block 310. At block 312, the memory channel required to service the request is in active, powered up state and the associated memory controller proceeds to service the request.

The techniques described herein, can be easily combined with techniques described in the co-pending application incorporated in this application. For example, the co-pending application describes techniques wherein the bus arbiter can maximize page hit rate for memory access requests. Maximizing page hits contributes to power savings because it reduces the frequency of opening new pages, which is a power hungry process. The bus arbiters in exemplary embodiments are configured to include parameters for maximizing page hit rate, along with power mode information and latency characteristics of bus masters in assigning priorities to memory access requests. Accordingly, the disclosed embodiments feature lower power consumption and higher performance, compared to conventional schemes.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

It will be appreciated that embodiments of processing system 200 described herein may be included within a mobile phone, portable computer, hand-held personal communication system (PCS) unit, portable data units such as personal data assistants (PDAs), GPS enabled devices, navigation devices, settop boxes, music players, video players, entertainment units, fixed location data units such as meter reading equipment, or any other device that stores or retrieves data or computer instructions, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the various embodiments.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment can include a computer readable media embodying a method for bus arbitration to reduce memory access power. Accordingly, the various embodiments are not limited to illustrated examples and any means for performing the functionality described herein are included in the various embodiments.

While the foregoing disclosure shows illustrative embodiments of the invention, it should be noted that various changes and modifications could be made herein without departing from the scope of the various embodiments as defined by the appended claims. The functions, steps and/or actions of the method claims in accordance with the various embodiments described herein need not be performed in any particular order. Furthermore, although elements of the various embodiments may be described or claimed in the singular, the plural is contemplated unless limitation to the singular is explicitly stated.

What is claimed is:

1. A method of arbitrating requests from bus masters for access to shared memory in a processing system comprising:
   dividing the shared memory into memory channels;
   determining power modes associated with the memory channels;
   assigning priorities to the requests based at least in part on the power modes; and
   scheduling the requests based on the assigned priorities.

2. The method according to claim 1, wherein the power mode associated with a memory channel comprises a powered up mode and a powered down mode for the memory channel.

3. The method according to claim 2, wherein assigning priorities to the requests based at least in part on the power modes comprises maximizing a duration of the powered down mode.

4. The method according to claim 1, further comprising associating latency characteristics with the bus masters and assigning priorities to the requests based on latency characteristics of the bus masters.

5. The method of claim 1, further comprising associating pages in the shared memory with the requests, and assigning priorities to the requests based on maximizing page hit rate.

6. The method of claim 1, wherein the processing system further comprises:
   a bus interconnect system to couple the bus masters to the memory channels;
   memory controllers to control access to the memory channels and monitor the power modes of the memory channels;
   a power mode register coupled to the memory channels, to store power mode information of the memory channels; and
   bus arbiters coupled to the memory controllers and the power mode register, to assign priorities to the requests based at least in part on the power modes.

7. A processing system comprising:
   a shared memory system divided into memory channels;
   bus masters configured to generate requests to the shared memory system;
   memory controllers configured to determine power modes associated with the memory channels; and
   bus arbiters configured to assign priorities to the requests based at least in part on the power modes.

8. The processing system of claim 7, wherein the power mode associated with a memory channel comprises a powered up mode and a powered down mode for the memory channel.

9. The processing system of claim 8, wherein assigning priorities to the requests based at least in part on the power modes comprises maximizing a duration of the powered down mode.

10. The processing system of claim 7, wherein assigning priorities to the requests based at least in part on the power modes further comprises associating latency characteristics with the bus masters and assigning priorities to the requests based on the latency characteristics of the bus masters.

11. The processing system of claim 7, wherein assigning priorities to the requests based at least in part on the power modes further comprises associating pages in the shared memory with the requests, and assigning priorities to the requests based on maximizing page hit rate.

12. The processing system of claim 7 further comprising a power mode register coupled to the memory channels and bus arbiters, to store power mode information of the memory channels.

13. A processing system comprising:
   a shared memory divided by memory channel means;
   bus master means for sending requests to the shared memory system;
   means for determining power modes associated with the memory channels;
   means for assigning priorities to the requests based at least in part on the power modes; and
   means for scheduling the requests based on the assigned priorities.

14. The processing system of claim 13, wherein the power mode associated with a memory channel comprises a powered up mode and a powered down mode for the memory channel.

15. The processing system of claim 14, wherein means for assigning priorities to the requests based at least in part on the power modes comprises means for maximizing a duration of the powered down mode.

16. The processing system of claim 13, further comprising means for associating latency characteristics with the bus masters and means for assigning priorities to the requests based on latency characteristics of the bus masters.

17. The processing system of claim 13, further comprising means for associating pages in the shared memory with the requests, and means for assigning priorities to the requests based on maximizing page hit rate.

18. A method of arbitrating requests from bus masters for access to shared memory in a processing system comprising:
   step for dividing the shared memory into memory channels;
   step for determining power modes associated with the memory channels;
   step for assigning priorities to the requests based at least in part on the power modes; and step for scheduling the requests based on the assigned priorities.

19. The method according to claim 18, wherein the power mode associated with a memory channel comprises a powered up mode and a powered down mode for the memory channel.

20. The method according to claim 19, wherein the step for assigning priorities to the requests based at least in part on the power modes comprises a step for maximizing a duration of the powered down mode.

21. The method according to claim 18, further comprising a step for associating latency characteristics with the bus masters and a step for assigning priorities to the requests based on latency characteristics of the bus masters.

22. The method according to claim 18, further comprising a step for associating pages in the shared memory with the requests, and a step for assigning priorities to the requests based on maximizing page hit rate.

23. A non-transitory computer-readable storage medium comprising code, which, when executed by a processor, causes the processor to perform operations for arbitrating request from bus masters for access to a shared memory divided into memory channels, the non-transitory computer-readable storage medium comprising:
- code for determining power modes associated with the memory channels;
- code for assigning priorities to the requests based at least in part on the power modes; and
- code for scheduling the requests based on the assigned priorities.

* * * * *